United States Patent [19]

Bergersen

[11] 4,092,626
[45] May 30, 1978

[54] CONTINUOUS WEB CONSISTING OF RESISTANCE FOIL MATERIAL BETWEEN TWO INSULATING FOIL LAYERS AND METHOD FOR THE PRODUCTION OF SUCH WEBS

[75] Inventor: Hans Amund Bergersen, Oslo, Norway

[73] Assignee: Patentkonsortiet Robert Meinich & Co., Oslo, Norway

[21] Appl. No.: 747,641

[22] Filed: Dec. 6, 1976

Related U.S. Application Data

[60] Division of Ser. No. 602,189, Aug. 6, 1975, Pat. No. 4,025,893, which is a continuation of Ser. No. 405,076, Oct. 10, 1973, abandoned.

[30] Foreign Application Priority Data

Oct. 13, 1972  Norway ............................... 3688/72

[51] Int. Cl.² .................. H01C 3/06; H01C 17/28
[52] U.S. Cl. ..................... 338/212; 29/611; 29/619; 206/330; 219/528; 338/289; 338/295; 338/322
[58] Field of Search ............... 338/212, 295, 289, 322, 338/309; 219/529, 528; 29/611, 619, 621; 174/117 A; 206/330; 339/276 SF

[56] References Cited

U.S. PATENT DOCUMENTS

| | | | |
|---|---|---|---|
| 1,514,618 | 11/1924 | Ide | 176/330 |
| 2,815,124 | 12/1957 | Pellier | 206/330 |
| 3,075,705 | 1/1963 | Wilhelm | 174/117 A |

FOREIGN PATENT DOCUMENTS

925,184  5/1963  United Kingdom ................. 338/289

*Primary Examiner*—Elliot A. Goldberg
*Attorney, Agent, or Firm*—Cooper, Dunham, Clark, Griffin & Moran

[57] ABSTRACT

A continuous composite web from which electrical low temperature heating mats can be produced by transverse cutting at certain positions and possibly by effecting an edge insulation and attaching electrical connections. A method for the production of such webs is also disclosed. The web consists of resistance foil material between two insulating foil layers which are joined in the areas of direct contact to secure the resistance foil. The resistance foil material is in the form of parallel, continuous, longitudinal strips and transverse strips extending transversely to said longitudinal strips at desired intervals and connected thereto to form electrical connections between adjacent foil strips. The transverse strips extend substantially across the total width of the web and can be in the form of an insulation strip having flat foil conductive pieces on the insulation strip.

7 Claims, 7 Drawing Figures

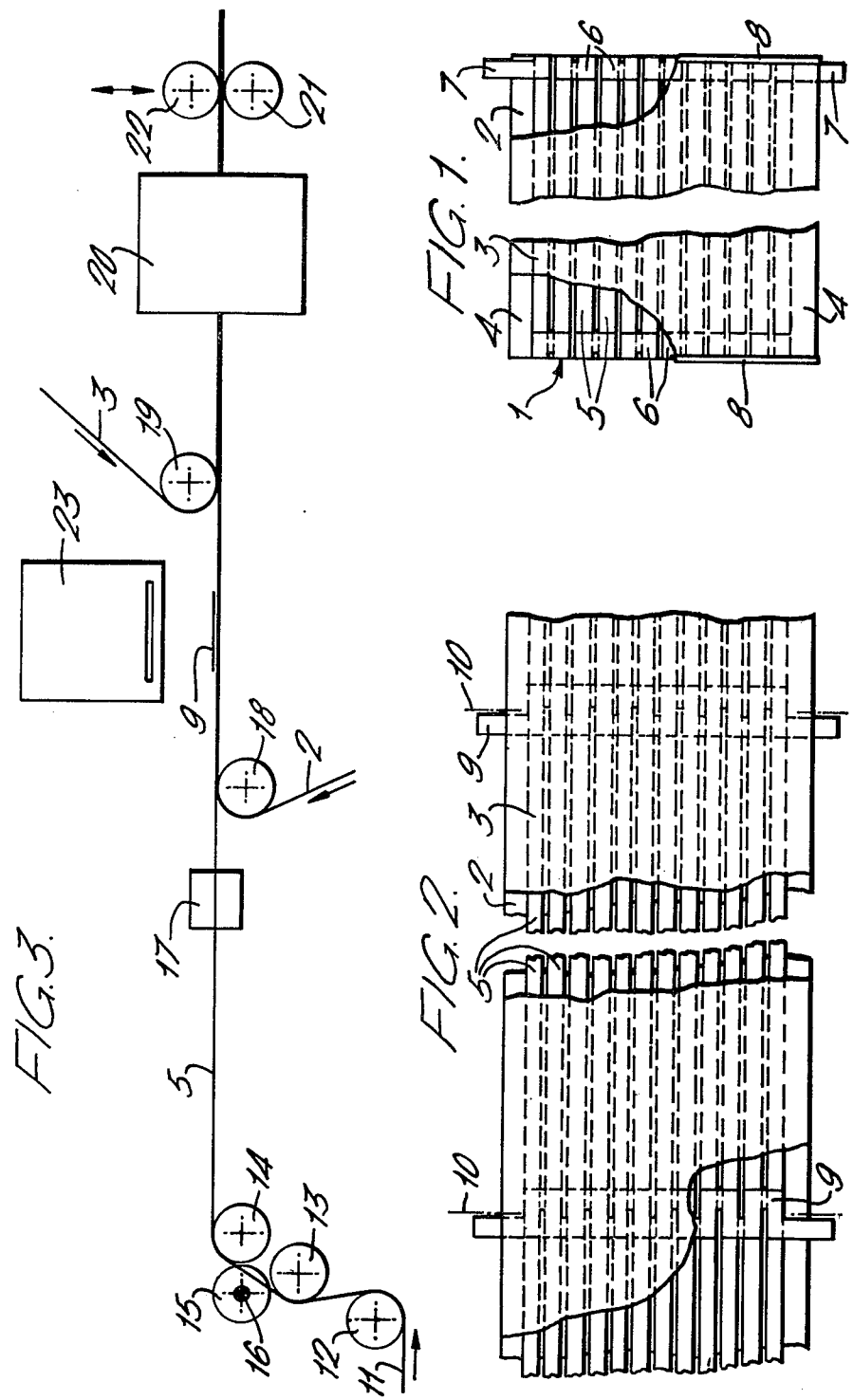

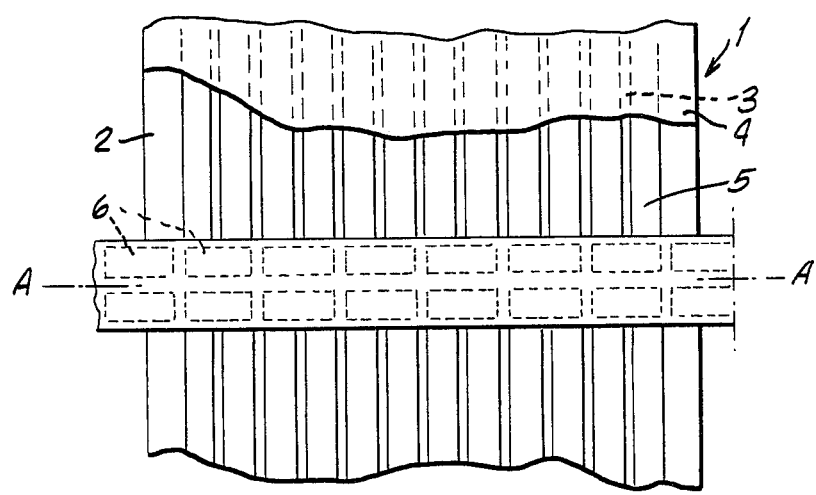

CONTINUOUS WEB CONSISTING OF RESISTANCE FOIL MATERIAL BETWEEN TWO INSULATING FOIL LAYERS AND METHOD FOR THE PRODUCTION OF SUCH WEBS

This application is a divisional application of Ser. No. 602,189 filed Aug. 6, 1975 now U.S. Pat. No. 4,025,893 which is a continuation of Ser. No. 405,076 filed Oct. 10, 1973, now abandoned.

BACKGROUND OF THE INVENTION

The present invention relates to a continuous web which by transverse cutting at selected positions and possibly by effecting an edge insulation and attaching electrical connections provides electrical low temperature heating mats, said web consisting of resistance foil material between two insulating foil layers which are joined in the areas of direct contact to secure the resistance foil, a plurality of parallel, conductive, longitudinal foil strips and transverse strips extending transversely to said longitudinal strips at desired intervals lying between the insulating layers, said transverse strips being connected to the longitudinal strips and being so constructed as to form electrical connections between adjacent longitudinal strips. The invention also relates to a method for the production of such webs.

Heating mats of the abovementioned type has hitherto been produced as disclosed in Norwegian Patent Specification 109 918 (corresponds to U.S. Pat. No. 3,263,307), i.e. by cutting a continuous web consisting of a resistance foil lying between two broader, insulating layers that are joined in the areas of direct contact, i.e. outside the resistance foil and through slots therein. The desired configuration of the resistance foil and through slots therein. The desired configuration of the resistance foil has been produced by interrupted slotting of the foil, material being removed to form longitudinal slots of uniform width, said slots being periodically interrupted over short distances. By staggering the interruptions of every second slot from the interruptions of the remaining slots a subsequent cutting of the continuous web in the areas of interruption of the slots will produce heating mats with a meander patterned resistance body have meander arms extending the full length of the mat. After the cutting, the resistance foil which extends right to the terminal edges of the mat, must be insulated along these edges, and this can e.g. be effected by applying a bead of thermoplastic material or an adhesive which solidifies upon cooling. Further, an electrical connection must be effected, i.e. the ends of the meander patterned resistance foil lying inside the mat must be connected to electrical conductors. This connection and the structure of the mat in other respects shall be such that the mat can be connected to an ordinary mains voltage of for instance 220 volts.

However, the method used in this connection for slotting a resistance web in the desired meander pattern entails some disadvantages. Thus, the fact that the slotting must be interrupted at certain intervals makes the method somewhat complicated and prone to disturbances. Further, the material removed in the forming of slots of uniform width represents an economic loss. Certainly, the material may be returned to the foil manufacturer, but the price paid for this waste material is, of course, not as high as for the finished foil. In connection with the provision of an electrical conductive connection from the resistance foil lying between the insulating layers to electrical conductors for connection to the mains, the known method of producing the heating mats also comprises some manual work which is difficult to adapt for automation.

From Swiss Patent No. 404,821 (FIG. 13) there is also known a suggestion for a heating band wherein several meander shaped current paths are provided between two insulating foils by longitudinal resistance strips of limited length and short transverse resistance strips. The band may be severed into band shaped heating elements having one or more meander patterned current paths which may be connected in parallel or in series. However, to place interrupted strips, especially short transverse strips, in a correct position will offer problems, and the patent specification does not teach how this may be done in continuous, automatic production. The patent specification also discloses (FIG. 14) another embodiment of the heating band having only longitudinal, continuous resistance strips. In this case, the transverse connections are to be established in a separate operation after the band has been severed into desired lengths. In preparation thereof, the longitudinal strips are doubled in certain intervals, e.g. by being folded back upon itself in Z folds. In order to avoid having to separate the insulating sheets when establishing the transverse connections, these connections must be formed outside the severed ends.

SUMMARY OF THE INVENTION

The object of the present invention is to obtain a continuous web of the type initially referred to, i.e. a web which already contains the transverse connections between the longitudinal resistance strips, said web being adapted for rational production on machines, i.a. as a consequence of the elimination of the problem of positioning short transverse elements, the web further allowing a simple further processing thereof to form finished heating mats.

The web according to the invention is characterized in that the longitudinal strips are continuous and extend in straight lines, and that the transverse strips extend substantially across the total width of the web.

The invention also comprises a method for the production of such webs, wherein a plurality of separate, conductive, longitudinal foil strips and transverse strips extending transversely to said longitudinal strips at desired intervals are interposed between two continuous webs of insulating material, said transverse strips being so constructed as to form electrical connections between adjacent longitudinal strips, characterized in that uninterrupted, longitudinal foil strips are placed continuously and in straight lines onto one of the insulating webs, that transverse strips extending substantially across the total width of the web are placed in position, and that the insulating webs are subsequently joined by heat-sealing in the areas of direct contact and the transverse strips lying between the insulating webs heat-sealed to the foil strips.

The continuous, longitudinal foil strips used may have been produced at an earlier stage independently of the production of the web. However, it is preferred to produce the longitudinal strips by means of uninterrupted slitting of a foil web along with the production of the mats. The foil web may be slitted by means which do not remove substantial amounts of material, whereupon the produced foil strips are given a desired spacing in the tansverse direction by means of stationary spacer means which are provided in each slit behind the slitting means and are spaced corresponding to the width of the strips.

The connection between the meander arms at the ends of the mat are provided by means of separate, transverse, conductive elements. In the production of the continuous web it is, however, not necessary to apply each of the short transverse elements separately. On the contrary, they are applied in position as a continuous strip which may be of various constructions. If the continuous strip consists of conductive material over its full length, it must, possibly at a later stage, be severed in such a way that a conductive connection is established only between adjacent foil strips. This can be achieved already as a consequence of the transverse cutting of the web when severed into individual heating mats. If desired, a notch may have to be made in the cut edges.

Further features of the invention will appear from the following specification, reference being had to the accompanying drawings, which diagrammatically shows a heating mat and a continuous web according to the invention and diagrammatically illustrates the method according to the invention.

IN THE DRAWINGS

FIG. 1 is a diagrammatic plan view of a heating element produced from a web according to the invention.

FIG. 2 is a fragmentary view of a continuous, composite web according to the invention which may be used for the production of heating mats as shown in FIG. 1.

FIGS. 3 and 4 are side and plan views, respectively, of a plant which is shown in a highly diagrammatic way and which illustrates the method according to the invention.

FIGS. 5 and 6 and 6a show alternative constructions of the transverse strips.

DESCRIPTION OF THE PREFERRED EMBODIMENTS

Figure 4:
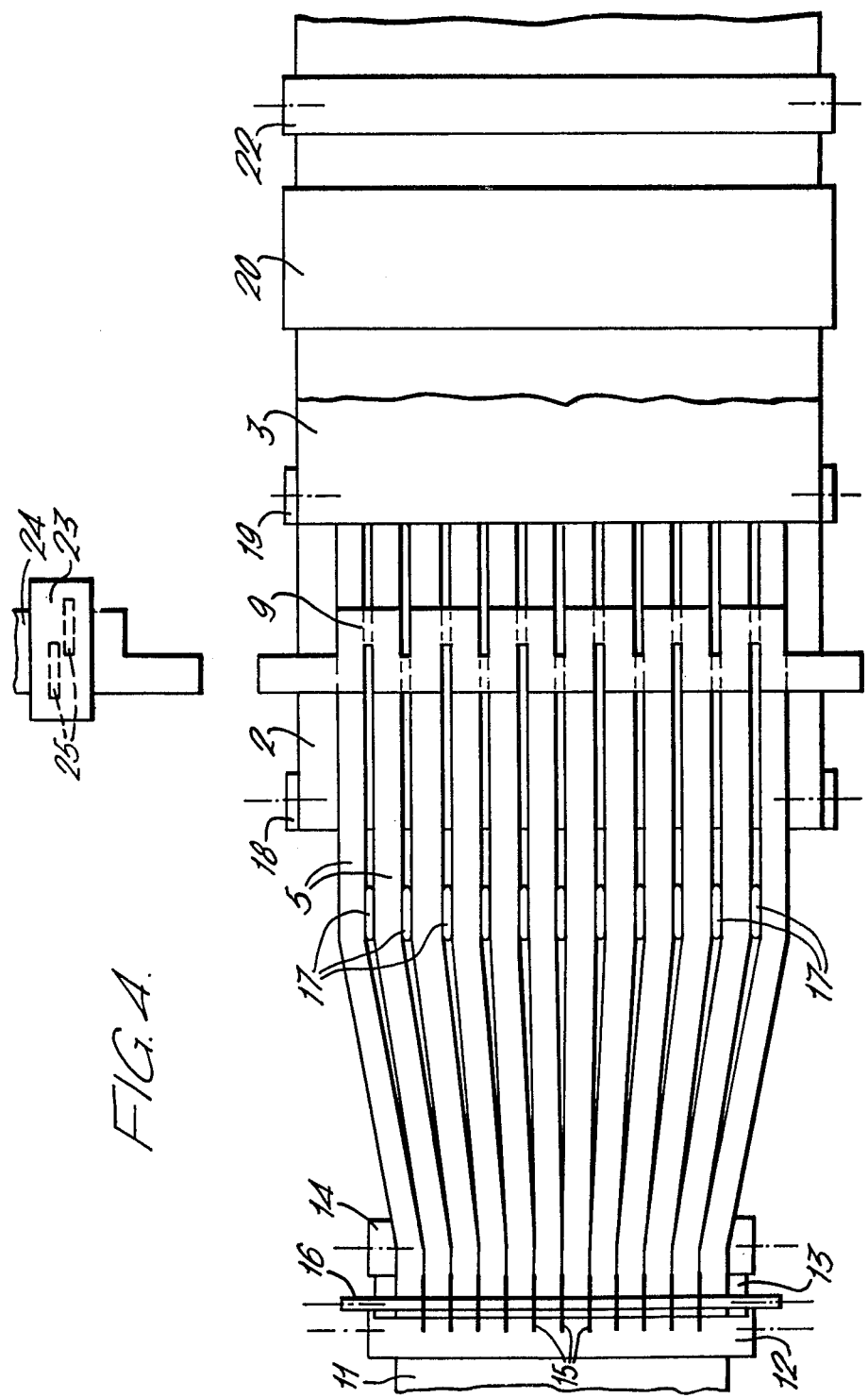

In FIG. 1 the middle portion of the heating mat has been cut away and the ends of the mat brought closer together to save space. However, it may be mentioned that the heating mats for radiant heating of rooms to which the invention relates, may typically have a width of 30 - 120 cm and a length of 1 - 10 m. The mat in FIG. 1 consists of a resistance element 1 which is very thin and extends in meander-shaped windings, which element is enclosed in two layers 2 and 3 of flexible insulating foil material such as a plastic laminate, one side of which permits heat sealing. The meander arms which run in the longitudinal direction of the mat have uniform width and should for reasons of uniform heating be as narrowly spaced as possible. It is therefore important that the distance between the meander arms is uniform, which implies an exact edge cutting of the meander arms and an exact guiding thereof to the place where they are secured between the two insulating layers 2 and 3 as will be described late . To make room for fastening means such as nails or the like so that these may be passed through the heating mat with the least possible risk of damaging the resistance foil, relatively broad areas 4 along the edges of the heating element are not covered by the resistance element. Similar longitudinal areas for securing the mat may, if desired, also be provided within the edges of the mat. The width of the heating mat and the distance between the open areas are preferably chosen in accordance with modules commonly used in the building trade so as to correspond to the positioning of pegwoods or other means for attaching the heating mats.

The resistance element 1 consists of separate parallel strips 5 of a conductive foil material having a low melting point, such as a foil of a lead-thin-antimony alloy having a melting point of about 180° C, a thickness of about 17 $\mu$m and a resistivity of about 0.15 ohm · $mm^2/m$. At each end of the heating mat the foil strips 5 are connected in pairs by means of short strip elements 6 of copper. These transverse elements 6, which for instance may have a thickness of about 50 $\mu$m, are soldered to the longitudinal foil strips 5 to establish electrical conductive connections between adjacent longitudinal strips. As it will be seen, the transverse elements 6 connect adjacent longitudinal strips 5 starting out with the outermost strip at one end of the mat, whereas the transverse element 6 connect adjacent longitudinal strips starting with the strip next to the outermost one at the other end of the mat. In this way the transverse elements 6 together with the longitudinal foil strips 5 will form a meander patterned resistance element, the resistance of which will substantially be determined by the longitudinal foil strips 5.

At one end of the mat there are also arranged two copper strips 7 extending between the insulating layers 2 and 3 and beyond the lateral edges of the mat, said copper strips being connected to one each of the outermost foil strips 5 to make an electrical connection between the resistance element 1 and electrical conductors (not shown) which can be soldered to or otherwise connected to the free ends of the copper strips 7. For insulation of the areas of the resistance element 1 extending right to the terminal edges of the mat, a bead-like string 8 of a hot melt adhesive is applied to each of these edges.

The web shown in FIG. 2 is composed of two heat-sealed layers 2 and 3 of plastic laminate with interjacent longitudinal foil strips 5 and transverse copper strips 9 at desired intervals in the web. It will readily be seen that heating mats as shown in FIG. 1 may be obtained from a web a shown in FIG. 2 by severing along the lines 10 and applying strings of adhesive to the cut edges to produce the insulating beads 8. As will be seen, the transverse strips 9 are similar. Each transverse strip is of the form which results when the short transverse elements 6 which form part of a mat at one end, and the transverse elements 6 which form part of an adjacent mat at the opposite end, are juxtaposed. Thus, in spite of the fact that the transverse elements 6 are separate elements which are only to connect adjacent longitudinal strips 5, there may be used continuous transverse strips 9 in the production of the web in FIG. 2. However, when these continuous strips are cut longitudinally, they are severed in the desired transverse elements 6, whereas the end portions of the transverse strips 9 extending beyond the web form the connections 7. In the embodiment shown the transverse elements 6 which upon cutting along the line 10 form part of one heating mat, interconnect the offset transverse elements forming part of the adjacent mat, so that the transverse elements 6 and possibly the connections 7 form a continuous strip which extends across the total width of the web. However, it is to be understood that there is nothing preventing the connection of the transverse elements 6 in other ways such as by means of a portion extending across the total width of the web, thereby producing a comb-shaped or twin comb-shaped, continuous transverse strip which is severed into the desired short, separate transverse elements 6 when cut longitudinally (i.e. transversely to the web).

A preferred method for the production of the web of FIG. 2 is shown in FIG. 3 and 4. A foil 11 of resistance material which is passed over guide rollers 12, 13 and 14, is slitted into a series of equally wide strips 5 by a knife means which in the drawing is shown as a row of circular knives 15 mounted on a rotatably mounted shaft 16. At a distance behind the knives 15 there is provided a transverse row of spacer means 17 having a thickness corresponding to the desired spacing between the foil strips 5 in the finished mat. The spacer means are arranged at a distance from each other corresponding to the width of the strip 5. Each of the strips 5 is passed between two spacer means 17. Thus, behind the spacer means 17 the foil 11 of resistance material will take the form of separate, parallelly extending foil strips. A web 2 of insulating heat-sealable plastic material is now applied from below via a roller 18. The web 2 and the longitudinal strips 5 thereon pass a station where a transverse strip 9 of copper having a lead coating on the underside is placed onto the strips at desired intervals. These transverse strips may have been produced in advance, or they may be produced in different ways in immediate connection with the production of the heating mats, as will be described in detail below. The strips 9 must, of course, be placed in position very accurately relatively to the position of the longitudinal strips 5. Immediately behind the strip positioning an insulating foil 3 of the same type as the foil 2 is fed onto the upper side of the longitudinal strips 5 and the transverse strips 9 via a roller 19. The insulating layers 2 and 3 with the interjacent longitudinal strips 5 and transverse strips 9 are then fed through a device 20 wherein the insulating plastic layers 2 and 3 are heat sealed to each other over the areas of direct contact, i.e. the areas where they are not separated by an interjacent longitudinal strip 5 or a transverse strip 9. Behind the welding device 20 there is provided a soldering device consisting of two rollers 21, 22, of which at least one is heated. When a transverse strip 9 passes the rollers 21, 22, the rollers are pressed together to exert pressure and heat upon the strip 9, whereby this strip is soldered to the longitudinal foil strips 5.

In FIGS. 3 and 4 it is indicated that the transvrse strips 9 may be produced from a continuous sheet or strip 24 by punching in a punch 23. The punch 23 may have two independent punching tools 25 for making notches in the strip 4 from opposite lateral edges of the strip. The strip 24 may be advanced intermittently. The width of the punching tools 25 may correspond to the desired spacing between the foil strips 5. This spacing will usually be the same for different sizes of heating mats. The operation of the punching tools 25 may be controlled in accordance with the desired distance between the punched notches. This distance is, of course, dependent upon the width of the longitudinal strips 5 which are to be connected by the copper strips 9. The end portions of the strip 9 which are to form the connections 7, may be produced by repeated operation of one of the punching tools 25.

Figure 5:
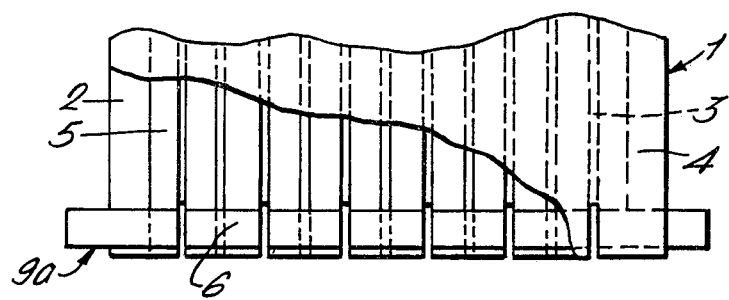
Figure 6:
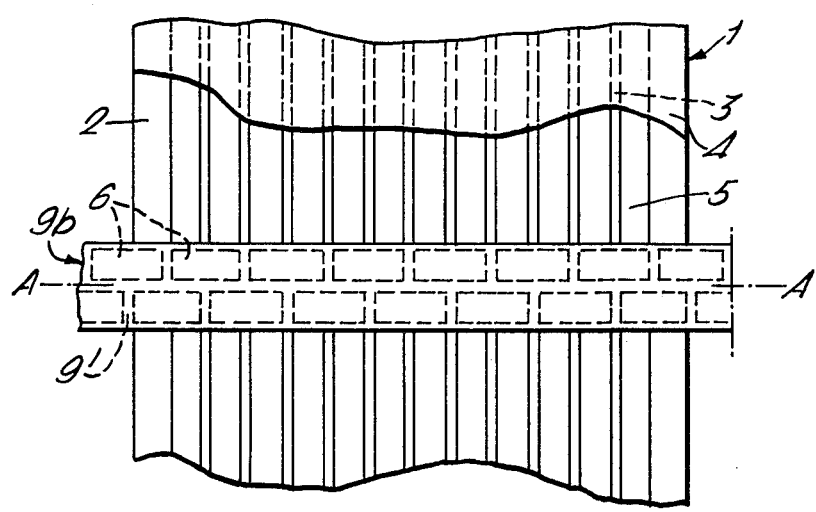

In FIGS. 5 and 6 alternative constructions of the transverse strips are shown. The transverse strip in FIG. 5 consists of a continuous transverse strip 9a which is soldered transversely to the longitudinal strips 5. After severing of the web 1 the strip material of the transverse strips between every second longitudinal strip 5 is removed by making notches in the severed edges, thereby producing separate transverse elements 6 which connect every second meander arm. The material may be removed either by shearing or by punching, and the notches may be covered by application of an adhesive tape on the terminal edges, the adhesive tape having such a width that it covers the notches in their total depth. Alternatively, a hot melt adhesive 8 as previously discussed may be applied for covering the terminal edges and the edes of the notches. Of course, the transverse strip 9a may be of double width to form the transverse elements in two mats.

In FIG. 6 the transverse strip 9b consists of a transverse non-conductive carrier sheet 9' to which precut conductive foil elements 6 are secured. The arrangement of the transverse elements 6 on the carrier sheet 9' is such that the transverse elements 6 will connect adjacent longitudinal strips 5.

In FIG. 6 the precut transverse elements 6 are arranged in two rows, the elements of one row being offset with respect to the elements of the other row. However, the transverse elements of each row may, if desired, be arranged directly opposite the elements of the second row as in FIG. 6a, since an offset arrangement of the conductive connection elements in the two rows such as in the strip design in FIG. 4 is not necessary to produce a continuous strip when a carrier sheet 9' is used. In that instance only every second transverse strip will be identical, because it is not the same two longitudinal strips which are to be connected at the opposite ends of a mat.

What I claim is:

1. In a flexible composite web of longitudinally extending and transversely spaced resistance foil strips positioned between insulating layers and in which said resistance foil strips are connected into a meander resistance path by a row of short conductive pieces, the improvement wherein said row of short conductive pieces comprises a non-conductive carrier strip, at least one row of spaced conductive flat foil tabs carried by said carrier strip and facing the resistance foil strips and making electrical contact therewith, said conductive flat foil tabs each connecting the strips of adjacent resistance foil strips.

2. A web according to claim 1, wherein said carrier strip carries two rows of conductive flat foil tabs, the flat foil tabs in one row being arranged directly opposite the flat foil tabs in the other row.

3. A web according to claim 1, wherein said carrier strip carries two rows of conductive flat foil tabs, the flat foil tabs in one row being transversely offset from the flat foil tabs in the other row by a distance corresponding to the distance between the centers of adjacent resistance foil strips.

4. A web according to claim 1, wherein said carrier strip also carries conductive end elements extending sideways beyond the web, said end elements being connected to the outer resistance foil strips for serving as terminal connections.

5. In a method for the production of a flexible composite web of longitudinally extending and transversely spaced resistance foil strips positioned between insulating layers, the improvement comprising providing a non-conductive carrier strip carrying at least one row of spaced conductive flat foil tabs, placing said carrier strip upon the resistance foil strips transversely thereacross in a position in which the conductive flat foil tabs face the resistance foil strips and make electrical contact therewith, said conductive flat foil tabs each connecting the strips of a pair of adjacent resistance foil strips, and electrically joining said conductive flat foil tabs to said resistance foil strips.

6. A method as claimed in claim 5, wherein the transverse strips are produced by applying precut conductive flat foil tabs to a non-conductive carrier strip at desired intervals, the conductive flat foil tabs being arranged in two rows, the tabs in one row being arranged directly opposite the tabs in the other row.

7. A method as claimed in claim 5, wherein the transverse strips are produced by applying precut conductive flat foil tabs to a non-conductive carrier strip, the tabs being arranged in two rows, the tabs in one row being transversely offset from the tabs in the other row by a distance corresponding to the distance between centers of adjacent foil strips.

* * * * *